United States Patent [19]
Ma et al.

[11] Patent Number: 5,258,339
[45] Date of Patent: Nov. 2, 1993

[54] FORMATION OF ZEOLITE MEMBRANES FROM SOLS

[75] Inventors: Yi H. Ma, Worcester, Mass.; Shouhe Xiang, Tianjin, China

[73] Assignee: Worcester Polytechnic Institute, Worcester, Mass.

[21] Appl. No.: 850,045

[22] Filed: Mar. 12, 1992

[51] Int. Cl.$^5$ .................. B01J 20/18; B01J 20/28
[52] U.S. Cl. ........................... 502/4; 502/60; 502/64; 210/500.25
[58] Field of Search ............ 502/4, 60, 62, 64; 210/500.25

[56] References Cited

U.S. PATENT DOCUMENTS

| | | | |
|---|---|---|---|
| 4,113,843 | 9/1978 | Mirsky et al. | 423/329 |
| 4,699,892 | 10/1987 | Suzuki | 502/4 |
| 5,100,596 | 3/1992 | Haag et al. | 502/4 |

FOREIGN PATENT DOCUMENTS

| | | |
|---|---|---|
| 1235684 | 4/1988 | Canada . |
| 60-129119 | 7/1985 | Japan . |
| 62-61643 | 3/1987 | Japan . |
| 63-291809 | 11/1988 | Japan . |

OTHER PUBLICATIONS

C. J. Brinker, et al., *Journal of Non-Crystalline Solids*, 48, 47–64 (1982).
Thomas Bein et al., *J. Am. Chem. Soc.*, 111, 7640–7641 (1989).
H. J. C. te Hennepe, et al. *J. of Membr. Sci.*, 35, 39–55 (1987).
T. Bein, et al., *Zeolites: Facts, Figures, Future*, 887–896 (1989).
Peter A. Jacobs, et al., *J. Chem. Soc. Chem. Commun.*, 591–593 (1981).
U. Muller, et al., *ACS Symposium Series*, 398, 346–359 (1989).

*Primary Examiner*—Carl F. Dees
*Attorney, Agent, or Firm*—Hamilton, Brook, Smith & Reynolds

[57] ABSTRACT

The present invention relates to a method of forming a zeolite membrane. The method includes forming an aqueous-based or an alcohol-based sol which can form a zeolite. The sol composition is then disposed on a porous support. The porous support and the sol composition are exposed to an atmosphere and to a temperature sufficient to cause the sol composition to hydrothermally crystallize, thereby forming the zeolite membrane.

25 Claims, 4 Drawing Sheets

FORMATION OF ZEOLITE MEMBRANES FROM SOLS

BACKGROUND OF THE INVENTION

Zeolites typically are hydrothermally formed alumina silicates of Group I and Group II elements. They can be represented by the following empirical formula: $M_{2/n}O.Al_2O_3.xSiO_2.yH_2O$ wherein "x" is generally equal to or greater than two and "M" is a cation having a valency of "n". Synthetic zeolites generally have greater uniformity and purity than do natural zeolites. Also, synthetic zeolites have a greater degree of reproduceability and, therefore, are more reliably produced for industrial applications.

Synthetic zeolites have many uses. For example, they exhibit catalytic properties which give them considerable industrial importance. Also, the crystallographic structure of synthetic zeolites makes them particularly suitable for use as molecular sieves and cation exchangers for separations.

Zeolite membranes are often formed by sequentially immersing a porous support in solutions of different reactants and then exposing the support, having the reactant solutions disposed in the pores of the support, to conditions sufficient to cause a zeolite to form, thereby forming a zeolite membrane. However, sequentially immersing a porous support into various reactant solutions causes the distribution of reactants in the pores of the support to be irregular. The quality of the resulting zeolite membrane is thereby significantly limited.

In one attempt to solve the problem of reactant uniformity, a gel of the reactants is first formed. The gel is disposed in the pores of a porous support and then exposed to conditions to form a zeolite. However, the uniformity of reactants in the gel is difficult to control. Further, gels typically do not penetrate porous supports well, thereby causing a substantial portion of the resulting zeolite to be disposed on the outside of the support rather than within the pores. Incomplete penetration of porous supports by zeolite precursors also significantly limits the performance of resulting zeolite membranes.

Therefore, a need exists for a method of forming a zeolite membrane which overcomes or minimizes the aforementioned problems.

SUMMARY OF THE INVENTION

The present invention relates to a method for forming a zeolite membrane and to a zeolite membrane formed by the method.

The method includes forming a sol composition which, during exposure to an atmosphere saturated with steam at a sufficient temperature and for a sufficient period of time, will form a zeolite. A porous support is then contacted with the sol composition. The porous support and the sol composition are exposed to an atmosphere saturated with steam at a temperature sufficient and for a period of time sufficient to cause the sol composition to hydrothermally crystallize, thereby forming the zeolite membrane.

This invention has many advantages. For example, the distribution and concentration of the components of the sol composition are significantly more uniform when disposed within the pores of porous support than are reactants disposed within pores by sequential dipping of the porous support in the reactants. The sol composition is also typically more uniformly distributed through porous supports than can be attained with gels. The resulting zeolite membrane can thereby have significantly increased uniformity and consequent improved performance. In addition, imperfections, such as cracks and fissures, in a zeolite membrane can be filled by repeating the method of the invention. For example, the sol composition can be disposed onto the imperfections, whereby the sol penetrates the fissures by capillary action. Penetration of cracks and fissures by the sol particles of the sol composition allows a gel to form which seals the cracks and fissures, thereby causing the subsequently formed zeolite to substantially seal the imperfections in the zeolite membrane. Further, the sol composition can be either aqueous-based or alcohol-based.

DETAILED DESCRIPTION OF THE INVENTION

Figure 1:
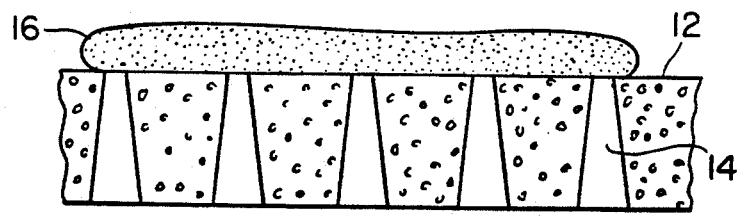
FIG. 1 is a section view of a porous alumina support having an aqueous-based sol disposed thereon.

The features and other details of the method of the invention will now be more particularly described and pointed out in the claims. It will be understood that the particular embodiments of the invention are shown by way of illustration and not as limitations of the invention. The same number present in different figures represents the same item. The principal features of the invention can be employed in various embodiments without departing from the scope of the invention.

The method of the invention includes forming a sol composition which, during exposure to an atmosphere saturated with steam at a sufficient temperature and for a sufficient period of time, will form a zeolite. The sol composition can be either aqueous-based or alcohol-based. An example of a suitable alcohol-based sol composition includes a silicon component, an aluminum component, and an alkali alkoxide component and, optionally, a suitable template agent. An example of a suitable template agent is tetrapropylammonia hydroxide (hereinafter "TPAOH").

In one embodiment, the sol composition is aqueous-based. An example of a suitable aqueous-based sol composition includes a silica component, a suitable template agent and alkali hydroxide component. The aqueous-based sol is formed by combining a suitable silica with a suitable aqueous medium under conditions sufficient to cause the silica to disperse within the aqueous medium and thereby form the aqueous-based sol.

The aqueous medium with which the silica is combined includes a cation component which is suitable for inclusion in a zeolite membrane In one embodiment, the aqueous medium includes sodium as the cation component, in the form of sodium hydroxide. Preferably, the aqueous medium is an aqueous caustic solution having a pH in the range of between about thirteen and fourteen. In a particularly preferred embodiment, the medium includes caustic at a concentration of 0.343N and also includes TPAOH, as a template agent, at a concentration of 0.343N.

The silica is suitable for forming an aqueous-based silica sol which can be employed by the method of the invention to form a zeolite membrane. An example of a suitable silica is Ludix colloidal silica, commercially available from E. I. du Pont de Nemours & Co. Preferably, the amount of silica which is combined with the aqueous medium is about thirty percent, by weight, of the aqueous-based sol formed.

In one embodiment, the silica and aqueous medium are combined by stirring them together. The silica and aqueous medium are combined at a temperature in the range of between about 5° C. and about 40° C. Preferably, the silica and aqueous medium are combined at about room temperature.

The mixture is heated, while stirring, at a rate of about 200° C. per minute to a temperature of about 100° C. to thereby cause the silica and aqueous media to form the aqueous-based sol. During stirring, the aqueous medium and silica combine as follows to form the aqueous-based sol composition:

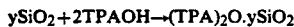

Where x and y are whole members in the range of from one to about eight.

Preferably, the resulting aqueous-based sol composition has a silica-to-$(Na_2O+(TPA)_2O)$ ratio of about 10:1 and a Water-to-silica ratio of about 16:1. The sol composition is thereafter allowed to cool to about ambient temperature.

Porous support 10, shown in FIG. 1, having surface 12, is suitable for forming a zeolite membrane according to the method of the present invention. Preferably, porous support 10 is a composite having an average pore diameter at surface 12 of up to about 2,000 Å. An example of a suitable composite porous support is a Membralox composite alumina membrane, commercially available from U.S. Filter, Inc. Also, porous support 10 is substantially flat. However, it is to be understood that porous support 10 can have other configurations, such as a cylinder, etc.

Porous support 10 is exposed to conditions sufficient to remove a substantial portion of any moisture from within pores 14 defined by porous support 10. For example, porous support 10 can be heated to a temperature of about 120° C. for a period of time of about two hours in air or an inert gas, such as nitrogen gas, and at a suitable pressure, such as a pressure in the range of between about $10^{-3}$ mmHg and about one atmosphere. Porous support 10 is then placed in a suitable desiccator and calcined at a temperature in the range of between about 500° C. and 600° C. in air at a pressure of about one atmosphere. The time period during which porous support 10 is calcined is in the range of between about two and four hours. Preferably, porous support 10 is calcined at a temperature of about 550° C. for a period of time of about two hours.

Figure 2:
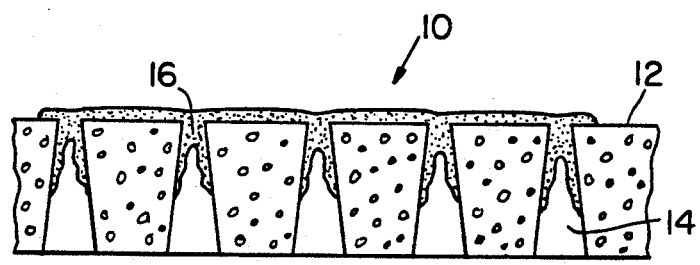
FIG. 2 is a section view of the porous alumina support shown in FIG. 1 after a portion of the aqueous-based sol has been adsorbed into the pores of the alumina support.

Sol composition 16, which has been formed as described above, is then disposed on surface 12 of porous support 10. Sol composition 16 is thereby at least partially adsorbed into pores 14 of porous support 10 by capillary action. At least a portion of the sol particles of sol composition 16 penetrates pores 14 of porous support 10, as can be seen in FIG. 2.

Figure 3:
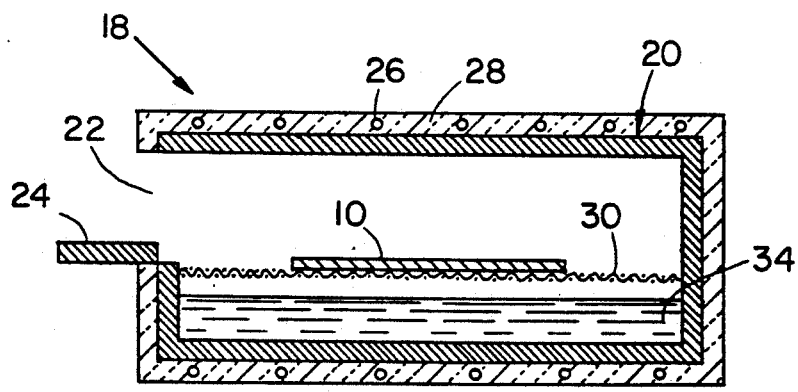
FIG. 3 is a section view of a system suitable for practicing one embodiment of the method of the present invention.

Porous support 10, having sol composition 16 disposed thereon, is then disposed in a suitable system for exposing sol composition 16 and porous support 10 to conditions sufficient to cause sol composition 16 to form a zeolite membrane in porous support 10 according to the method of the invention. System 18, illustrated in FIG. 3, is an example of a suitable system.

System 18 includes autoclave 20. Autoclave 20 defines inlet 22 and includes door 24 disposed at inlet 22 for sealing autoclave 20. Heating element 26 and insulation layer 28 are disposed about autoclave 20. Porous support 10 is supported by screen 30, which is disposed within autoclave 20. Preferably screen 30 is formed of stainless steel. Autoclave 20 is partially filled with water layer 34. The level of water layer 34 is below porous support 10 within autoclave 20.

Porous support 10 and the aqueous-based sol are exposed to an atmosphere and to a temperature sufficient to cause the sol composition to hydrothermally crystallize and thereby form a zeolite membrane. In one embodiment, autoclave 20 is sealed and porous support 10, having the sol composition disposed thereon, is heated to a temperature in the range of between about 130° C. and about 200° C. Porous support 10 is heated by actuating heating element 26. Preferably, the atmosphere within autoclave 20 is air which is saturated with steam. The pressure within autoclave 20 is maintained in the range of between about three and fifteen atmospheres.

In one preferred embodiment, support 10 and the aqueous-based sol are heated to a temperature of about 130° C. and maintained at that temperature and a pressure of about 3 atmospheres for a period of time of about 48 hours. Alternatively, porous support 10 and the sol composition are heated to a temperature of about 200° C. and maintained at that temperature and a pressure of about 15 atmospheres for about 16 hours. The sol composition thereby forms a zeolite membrane.

The zeolite membrane is then cooled to about ambient temperature. The zeolite membrane is removed from autoclave 20, washed with deionized water and then dried and calcined. In one embodiment, the zeolite membrane is then dried at a temperature of about 100° C. for a period of time of about two hours and then calcined at a temperature of about 600° C. for a period of about two hours.

In an alternate embodiment of the method of the invention, an aqueous-based sol is formed as described above. Preferably, the aqueous-based sol has the following molar ratios: $SiO_2$:TPAOH of about 10:1; $SiO_2$:$(Na_2O+(TPA)_2O)$ of about 10:1; and $H_2O$:$SiO_2$ of about 6.67:1.

Porous support 10 is dried and calcined as described above. Prior to disposing the aqueous-based sol on alumina support 10, a substantial portion of the pore volume of alumina support is filled with a suitable organic fluid. The organic fluid is substantially immiscible in water and has a vapor pressure which is significantly below that of water. An example of a suitable organic fluid is n-tridecane ($CH_3(CH_2)_{11}CH_3$). The amount of organic fluid disposed on porous support 10 is sufficient to substantially fill the pores of porous support 10. The organic fluid is adsorbed into the pores of porous support 10 by capillary action.

The aqueous-based sol is then disposed on surface of support. The amount of aqueous-based sol disposed on support 10 is sufficient to cause the silica dispersant in the sol to at least partially penetrate the pores within porous support 10. In one embodiment, the weight of aqueous-based sol disposed on porous support 10 is about seven percent of the combined weight of the sol composition and porous support 10.

The aqueous-based sol is disposed on porous support 10 for a period of time sufficient to allow at least a portion of the organic fluid to be displaced by the aqueous-based sol. At least a portion of the aqueous-based sol penetrates the pores of porous support 10 by capillary action. A portion of the organic fluid within the pores of porous support 10 is thereby displaced by the aqueous-based sol.

Figure 4:
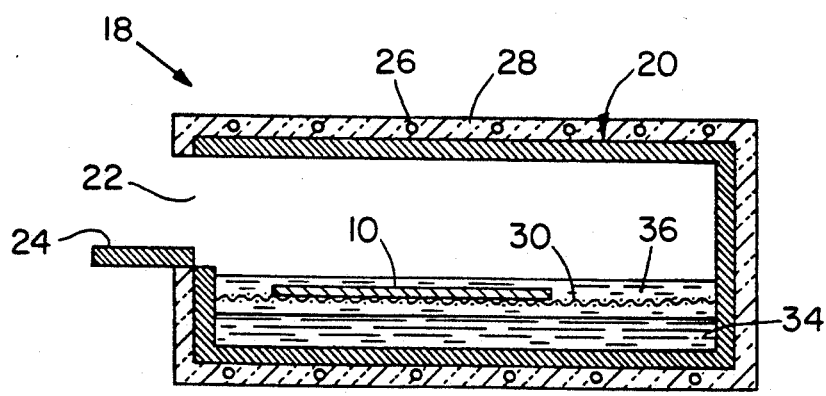
FIG. 4 is a section view of the system illustrated in FIG. 3 and which has been adapted for practicing an alternate embodiment of the method of the present invention.

Autoclave 20 is then partially filled with water, so that the level of water is below the top of screen 30, as shown in FIG. 4. Organic fluid layer 36, including the same organic fluid as that disposed within the pores of porous support 10, is disposed on top of water layer 34 to a level above the top of screen 30.

Porous support 10, having the organic fluid and the aqueous-based sol disposed within the pores thereof, is placed on top of screen 30, whereby porous support 10 is immersed in organic fluid layer 36. Porous support 10 is then exposed to a temperature sufficient to cause the aqueous-based sol to hydrothermally crystallize, thereby forming a zeolite membrane. Although the mechanism of this embodiment of the invention is not completely understood, it is believed that organic fluid layer 36 significantly diminishes dilution of the silica-containing sol particles within the pores of porous support 10 by water vapor within autoclave 20. In one embodiment, porous support 10 is heated in autoclave 20 to a temperature of about 130° C. for about forty-eight hours and thereafter heated to a temperature of about 200° C. for about sixteen hours. The resultant zeolite membrane is cooled in autoclave 20 to about ambient temperature, as described in the previous embodiment. The zeolite membrane is removed from autoclave 20 and then dried and calcined as described above.

Optionally, pores and gaps, formed by packing of zeolite crystals of a zeolite membrane, can be substantially filled by the method of the invention. For example, an aqueous-based sol, formed by the method described above, can be disposed on a zeolite membrane, such as a zeolite membrane formed by the aforementioned method. Silica dispersant within the medium of the aqueous-based sol penetrates pores and gaps within the zeolite membrane by capillary action. Preferably, the aqueous-based sol is significantly more dilute than the sols described above, to thereby allow the aqueous-based sol to substantially fill the pores and gaps without significant gelling of the silica dispersant.

In an alternative embodiment of the method of the invention, an alcohol-based sol composition can be formed by mixing silicon, aluminum and an alkali alkoxide in amounts sufficient to form a desired type of zeolite. The mixture is then combined with ethanol to form the alcohol-based sol composition. The alcohol-based sol is then contacted with a suitable porous support as described in the previous embodiment. The porous support and alcohol-based sol are then exposed to hydrothermal treatment and removal of volatile components of the alcohol-based sol composition for in-situ formation of a gel and subsequent hydrothermal crystallization for formation of a zeolite membrane.

In still another alternative embodiment, the resulting alkoxide-containing alcohol-based sol composition is disposed on a suitable zeolite membrane, such as a zeolite membrane having pores and gaps which are too small for significant penetration of an aqueous-based sol which includes only a silica dispersant. The zeolite membrane, on which the sol composition has been disposed, is then exposed to conditions sufficient to hydrothermally crystallize the sol composition. A zeolite is thereby formed within the gaps and pores of the zeolite membrane. Preferably, hydrothermal crystallization is terminated during an induction-nucleation period of the crystallization.

In still another embodiment, gaps and pores of a zeolite membrane can be filled by forming an amophorous alumina-silica or silica from an alkoxide sol. The alkoxide sol composition is disposed on the zeolite membrane to thereby allow the sol composition to penetrate the pores and gaps of the zeolite membrane by capillary action. The alkoxide sol composition is then exposed to hydrothermal treatment to convert silica alumina alkoxide to amophorous alumina-silica. Preferably, the alkoxide sol composition is hydrothermally treated by exposing the zeolite membrane to a temperature of about 90° C. for about five hours. The zeolite membrane is then dried by a suitable method, such as by exposure to air. Additional alkoxide-containing sol is then disposed on the zeolite membrane to fill remaining pores and gaps and the process is repeated until the desired degree of blocking of pores and gaps within the zeolite membrane has been achieved. Preferably, the ratio of silica to alumina is 30.14:1 and the ratio of $Na_2O$ to alumina is 3.01:1.

In still another embodiment, an amorphous silica is formed by disposing an aqueous-based silica sol over the pores and gaps of a zeolite membrane, allowing the dispersant of colloidal silica to penetrate the pores and gaps by capillary action and then treated to form additional zeolite membrane. The resulting zeolite membrane is then cooled and dried. The process can then be repeated to fill remaining pores and gaps among the crystals of the zeolite membrane.

Optionally, a second solution can be disposed on the zeolite membrane after adsorption of a suitable first solution, such as a sodium silicate solution, into the pores. The second solution has a composition which allows formation of a dense precipitate within the pores and gaps of the zeolite membrane. An example of a suitable second solution is 0.5M calcium chloride ($CaCl_2$).

This invention will now be further and specifically described by the following examples. All parts and percentages are by weight unless otherwise stated.

EXAMPLE I

A flat $\alpha$-$Al_2O_3$ membrane, having pores which are about 2,000 Å in diameter, was dried and calcined at 120° C. and then at 550° C., each for two hours. After cooling, the membrane was weighed. The weight of the membrane was 0.8350 gms. The membrane was saturated with n-tridecane. The increased weight of the membrane was 0.1652 gms. Then the membrane was coated by an aqueous-based sol, which had the following molar composition: $SiO_2/TPAOH=10$; $SiO_2/(Na_2O+(TPA)_2O)=10$; and $H_2O/SiO_2=32.42$. The specific gravity of the sol was 1.059. The increased weight of the membrane was 0.0495 gms. The aqueous-based sol displaced n-tridecane in the pores of the sample. The weight of n-tridecane displaced by the aqueous-based sol was 0.0290 gms. The amount of sol incorporated into the pores of the membrane was calculated to be 82% of the volume of the pores. The membrane was placed in a bath of n-tridecane which had been disposed on a water layer in a stainless steel autoclave. The autoclave was sealed and heated at 130° C. for 42 hours. Next, the temperature was raised to 200° C. It was held at that temperature for 16 hours. The product was then washed with deionized water and dried at 200° C. for two hours. The weight of the membrane was 0.8407 gms. The increased weight as compared to the initial weight was 0.7%.

The membrane was next saturated with n-tridecane. It was then coated by the aqueous-based sol mentioned above. The weight of the aqueous-based sol incorporated into the sample, as compared to the weight of the sample, was 7.6%. The membrane was placed in a bath of n-tridecane in the stainless steel autoclave. The autoclave was sealed, heated to 130° C. and maintained at that temperature for 5 days. The product was washed with deionized water and then dried overnight at 200° C.

The membrane was saturated with n-tridecane again. Then the membrane was coated by the aqueous-based sol mentioned above. The weight of the aqueous-based sol incorporated into the sample, as compared to the weight of the sample, was 5.8%. Next, it was dried at 95° C. for one hour. It was then coated by a mixture of $Al(OC_4{}^sH_9)_3$, $Si(OC_2H_5)_4$ and $NaOC_2H_5$ in ethanol (Na wt %, 9.180) which had the following molar composition: $SiO_2/Al_2O_3=103.4$; and $SiO_2/Na_2O=9.85$. The membrane was placed on a stainless steel sieve which had been mounted in the autoclave and kept separate from the water layer in the autoclave. The autoclave was sealed and heated to 95° C. and maintained at that temperature for one hour, and then at 130° C. for 50 hours and 200° C. for 4 hours. The product was washed with deionized water. It was dried overnight at 95° C., and then at 200° C. for 4 hours. The membrane was then calcined by slowly heating the membrane to a temperature of 600° C. and holding that temperature for two hours.

The flux of p-xylene, m-xylene and 1,3,5 triisopropylbenzene (hereinafter "TIPB") across the resulting zeolite membrane is shown below in Table I:

TABLE I

| Flux of Solvents for Various Membranes | | | | | |
|---|---|---|---|---|---|
| Pressure difference (atm) | Flux (ml/mm² min) × 10⁻³ | | | Flux (ml/mm₂ min) × 10⁻³, TIPB | |
| | p-xylene $F_P$ | m-xylene $F_M$ | $F_P/F_m$ | $F_T$ | $F_P F_T$ |
| 6.8 | 1.51 | 0.998 | 1.51 | 0.167 | 9.04 |
| 13.6 | 4.11 | 1.84 | 2.23 | | |
| 20.4 | 6.53 | 2.19 | 2.98 | | |
| 23.8 | 7.30 | 2.21 | 3.30 | | |

Kinetic diameter (Å) p-xylene 5.85, m-xylene 6.80, TIPB 8.50

As can be seen in Table I, the zeolite membrane exhibits shape-selective properties.

EXAMPLE II

A porous $\alpha$-$Al_2O_3$ membrane having an average pore diameter of about 2,000 Å was dried and calcined at 120° C. and 550° C. for two hours, respectively. After cooling, the weight of the membrane was 0.5982 gms. The membrane was saturated with n-tridecane. The membrane was then coated by an aqueous-based sol which had the following molar composition $SiO_2/TPAOH=10$, $H_2O/SiO_2=16.1$, and $SiO_2/(Na_2O+(TPA)_2)=10$. The increased weight of the membrane was 0.0598 gms.

The membrane was allowed to dry at about room temperature for one day. The coating was repeated and the increased weight of the membrane was 0.0400 gms. The membrane was again dried at about room temperature for one day. The total amount of water evaporated from the reaction mixture was estimated at about 45%.

The membrane was then was placed in a bath of n-tridecane which had been placed over a water layer in the stainless steel autoclave. The autoclave was sealed and heated at 130° C. for three days. The product was washed with deionized water. Then it was dried at 95° C. and 200° C. for three hours, respectively. The membrane was coated by the aqueous-based sol mentioned above. The weight of the aqueous-based sol incorporated into the membrane as compared to the total weight of the membrane was about 8.8%.

The membrane was then dried at room temperature for one day. It was then placed on a stainless steel sieve which had been mounted in the autoclave and kept separate from the water layer. The autoclave was sealed and heated at 130° C. for 24 hours. The product was washed by deionized water and then dried for 4 hours at 95° C. and overnight at 200° C.

The membrane was coated by a mixture of $Al(OC_4{}^sH_9)_3$, $Si(OC_2H_5$ and $NaOC_2H_5)$ in ethanol (Na wt %, 9.180) having a molar composition of $SiO_2/Al_2O_3=103.4$, and $SiO_2/Na_2O=9.85$. The membrane was treated hydrothermally at 95° C. for 5 hours. The product was washed with deionized water. It was dried at 95° C. and then at 200° C., each for two hours. The membrane was then calcined by slowly raising the temperature from room temperature to 600° C., and then maintaining that temperature for two hours.

EXAMPLE III

A flat porous $\alpha$-$Al_2O_3$ membrane, having an average pore diameter of about 2,000 Å, was dried and calcined at 120° C. and then at 550° C., each for two hours. After cooling, the membrane was weighed. The weight of the membrane was 0.3449 gms. The membrane was saturated with n-tridecane. Then the membrane was coated by an aqueous-based sol having the following molar composition: $SiO_2/TPAOH=10$; $SiO_2/(Na_2O+(TPA)_2O)=10$; and $H_2O/SiO_2=16.1$. The increased weight of the membrane was 0.0466 gms. The membrane was placed in a bath of n-tridecane which had been placed over a water layer in the stainless steel autoclave. The autoclave was sealed and heated to 130° C. for one day. The temperature was then raised to 200° C. and it was held at that temperature for 16 hours. The product was washed with deionized water. The membrane was then treated thermally at 120° C. for 2 hours, at 200° C. for 2 hours, at 400° C. for one hour and at 600° C. for 2 hours. The weight of the membrane after treatment was greater than the initial weight by about 2.58%

The membrane was coated by a silica sol having a molar concentration "$M_{Si}$" of 3.97. It was dried at 50° C. and then at 100° C., each for one hour. The surface of the membrane was then cleaned by flowing air over the sample. The membrane was then calcined. The temperature was slowly raised from room temperature to 600° C. and held at that temperature for about 2 hours. The increased weight of the membrane was 0.0021 gms. A little water was added on the surface of the sample. Then it was dried at 90° C. for one hour. The membrane was then coated by $Si(OC_2H_5)_4$. The increased weight of the membrane was 0.0144 gms. The membrane was treated hydrothermally at 90° C. for 4 hours. The product was dried at 90° C. for one hour and at 120° C. for 8 hours.

Figure 5:
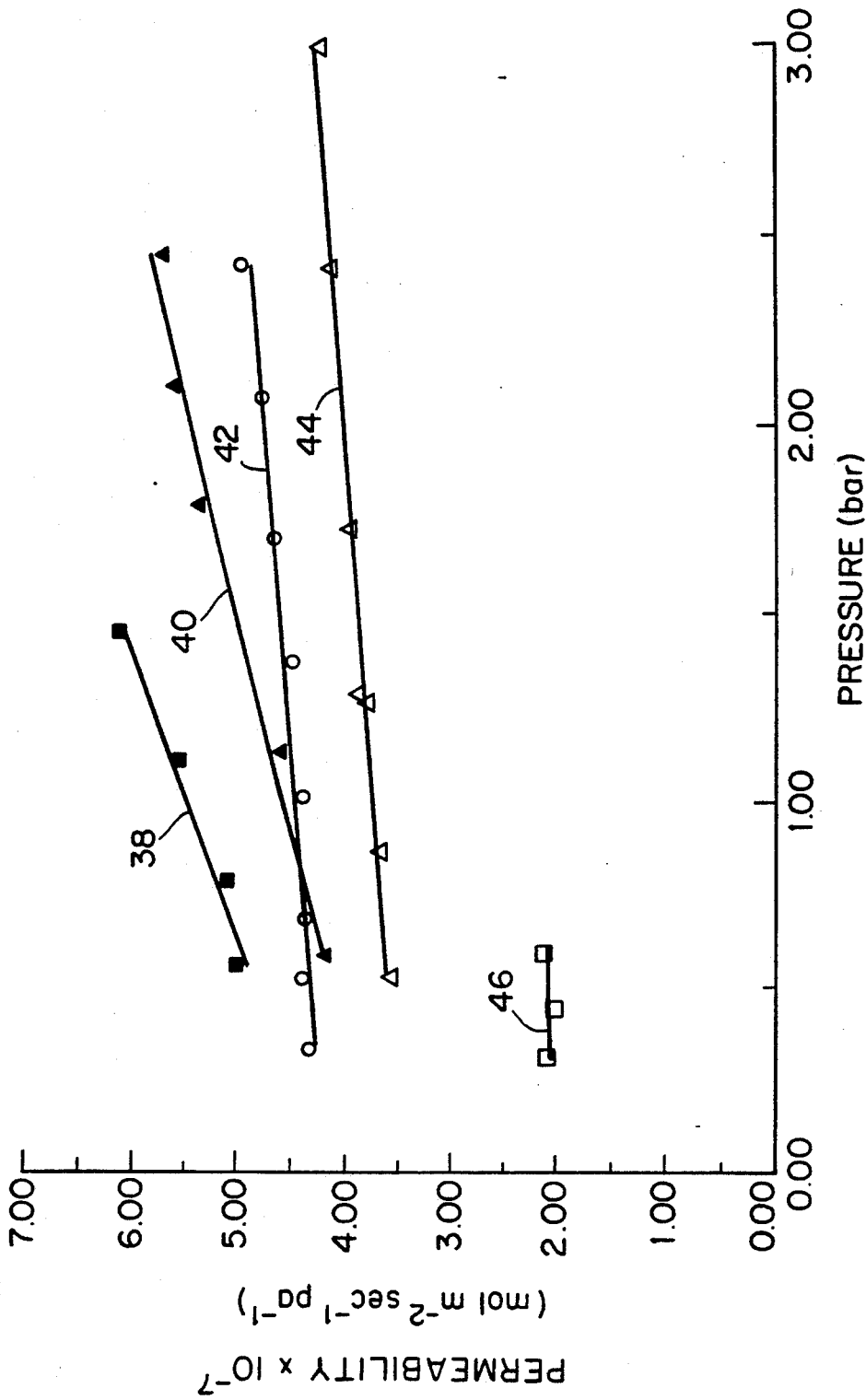
FIG. 5 is a plot of the permeabilities of various hydrocarbon gases through a zeolite membrane of the present invention.
Figure 6:
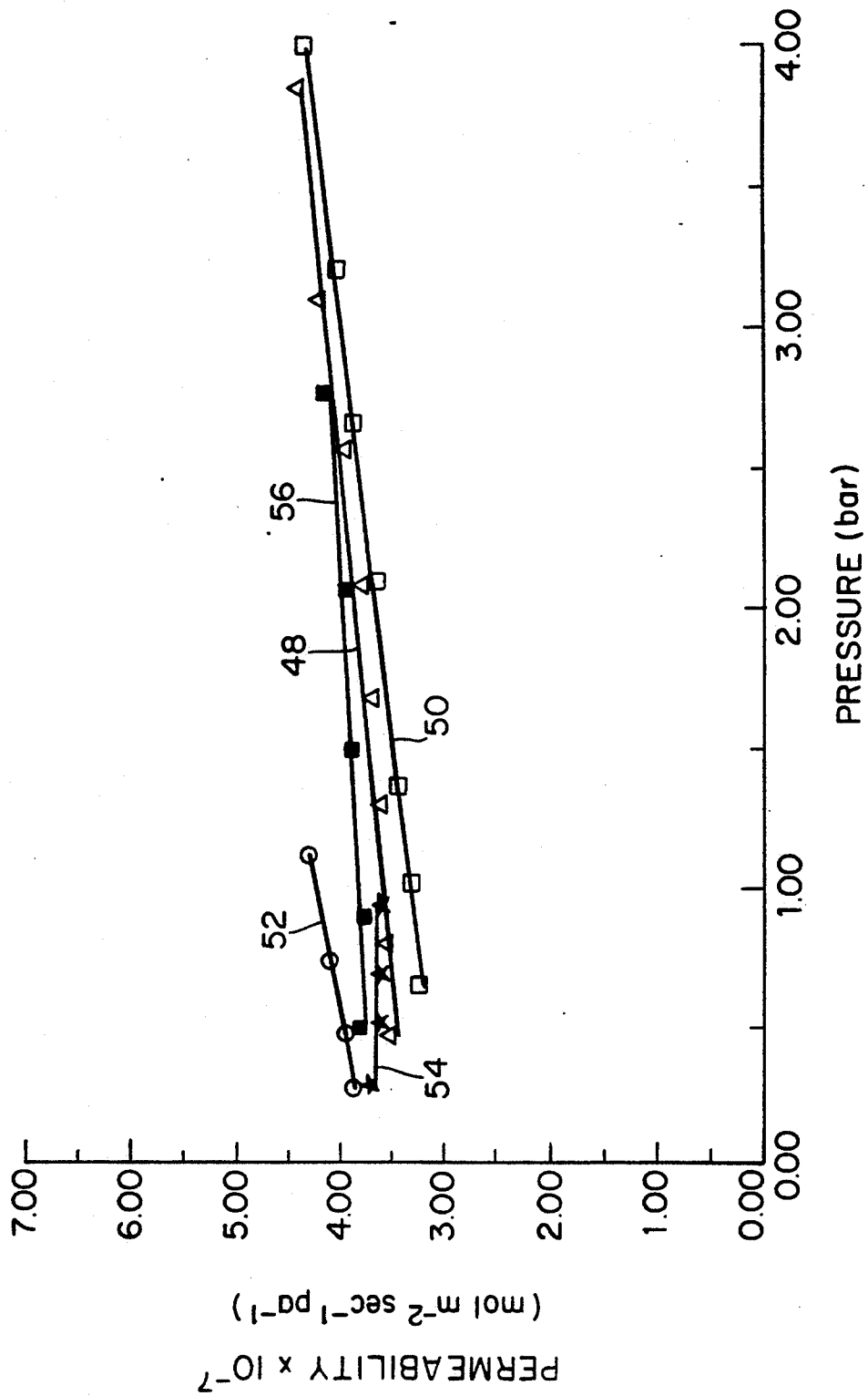
FIG. 6 is a plot of the permeabilities of additional hydrocarbon gases through a zeolite membrane of the present invention.
Figure 7:
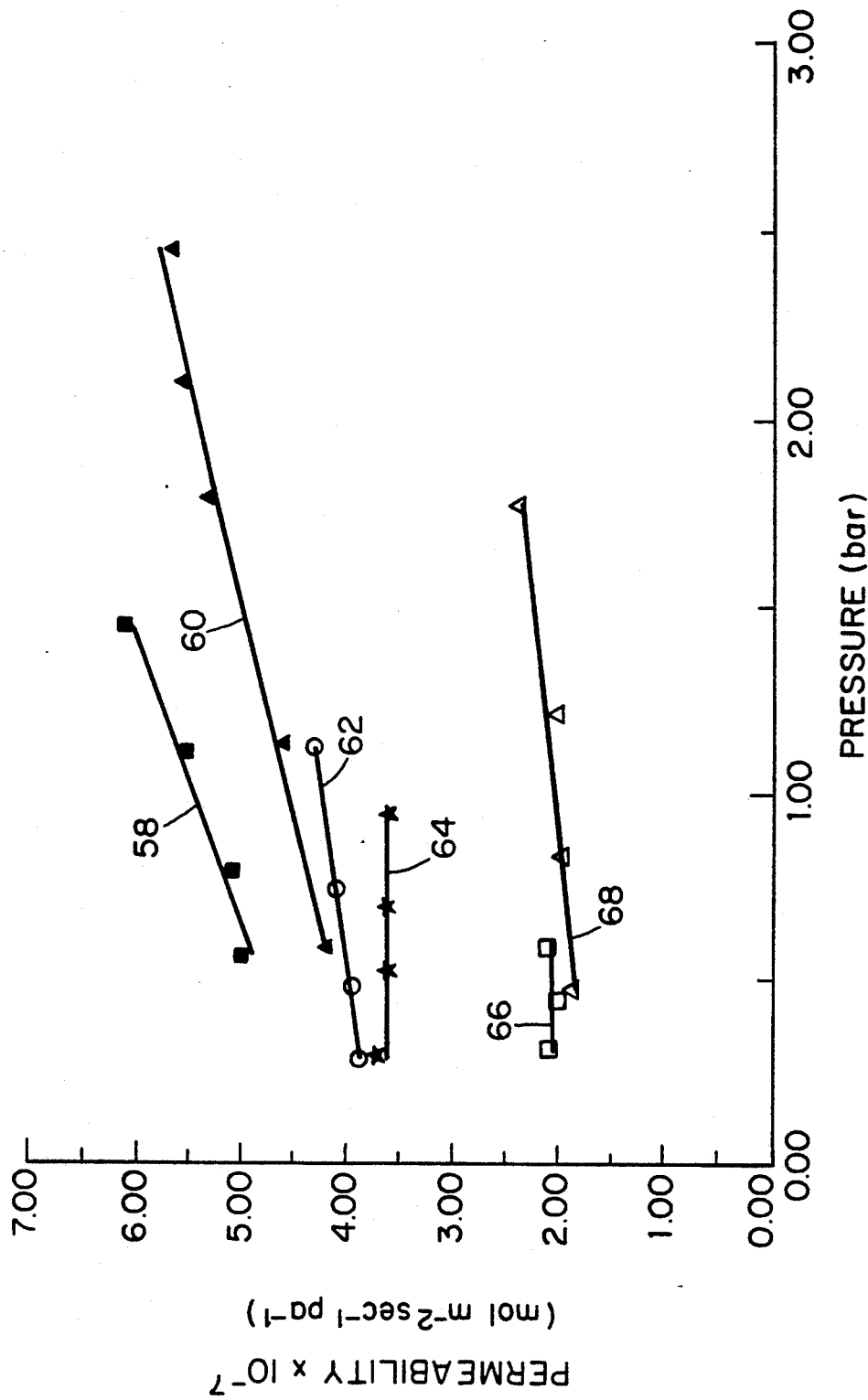
FIG. 7 is a plot of the permeabilities of various hydrocarbon gases through a zeolite membrane of the present invention.

The permeabilities of various gaseous hydrocarbons at room temperature and different pressures in the resulting zeolite membrane are shown in FIGS. 5, 6 and 7. Table II, below lists the gas corresponding to each permeability curve shown in FIGS. 5, 6 and 7:

TABLE II

| FIG. | | Gas |
|---|---|---|
| 5 | 38 | |
| | 40 | Isobutane |
| | 42 | Methane |
| | 44 | Propane |
| | 46 | 2,2 Dimethylpropane |
| 6 | 48 | Ethylene |
| | 50 | Propene |
| | 52 | Cis-2 butene |
| | 54 | Trans-2 butene |
| | 56 | Allene |
| 7 | 58 | Butane |
| | 60 | Isobutane |
| | 62 | Cis-2 butene |
| | 64 | Trans-2 butene |
| | 66 | 2,2 Dimethylpropane |
| | 68 | $SF_2$ |

As can be seen in FIGS. 5, 6 and 7, the permeabilities of the gaseous hydrocarbons varied considerably. The separation factors between small molecules and the large molecule, 2,2-dimethylpropane, range from 1.8 for propane to 3.0 for butane among the saturated hydrocarbons, and from 1.6 for propene to 2.2 for cis-2 butene among the unsaturated hydrocarbons.

EXAMPLE IV

A 40 Å $\gamma$-$Al_2O_3$ membrane was dried and calcined at 120° C. and then at 550° C., each for two hours. After cooling, the weight of the membrane was 0.4380 gms. An alcohol-based sol having a composition of $Al(OC_4^sH_9)_3$ and $Si(OC_2H_5)_4$ ($SiO_2/Al_2O_3$=2.02; $Al_2O_3$=1.043 mmol/g; and $SiO_2$=2.105 mmol/g). 0.0357 g of the alcohol-based sol was deposited on the surface of the membrane. The membrane was treated hydrothermally at 90° C. for 5 hours. Then it was dried at 90° C. and 120° C. for one hour and 5 hours, respectively. The membrane was again coated by an alcohol-based sol, having the following composition: $SiO_2/Al_2O_3$=30; $SiO_2$=4.24 mmol/g; and $Al_2O_3$=0.141 mmol/g. The increased weight of the membrane was 0.0252 gms. The membrane was treated hydrothermally at 90° C. for 5 hours. Then it was dried at 90° C. and 120° C. for one hour and 6 hours, respectively.

After the foregoing pretreatment, 0.0199 gms. of a sodium hydroxide solution, having a concentration of about 0.02 mol/l was deposited on the sample. The membrane was then coated by an alcohol-based sol. The weight added was 0.0207 gms. The alcohol-based sol was prepared as follows. One ml of the solution ($SiO_2/Al_2O_3$=30.14, $Na_2O/Al_2O_3$=3.01, concentration: $SiO_2$ 3.37 mmol/g, $Al_2O_3$ 0.112 mmol/g, $Na_2O$ 0.337 mmol/g) was diluted by ethanol until the total volume was 10 ml.

The coated membrane was placed on a stainless steel sieve which had been mounted in the autoclave and kept separate from the water layer. The autoclave was sealed and heated at 90° C. for 5 hours. Next, the temperature was raised to 200° C. at which it was held for 12 hours. The product was washed with deionized water. Then it was dried at 90° C. and 120° C. for one hour and 9 hours, respectively.

EXAMPLE V

The 40 Å $\gamma$-$Al_2O_3$ membrane was dried and calcined at 120° C. and then at 550° C., each for two hours. The weight of the membrane was 0.4568 gms. The membrane was coated by a silica sol ($M_{Si}$0.605). It was dried at 90° C. for one hour. The membrane surface was cleaned by flowing air across the sample. The membrane was calcined by heating the samples to 600° C. over a period of about five hours. The increased weight of the membrane was 0.0010 gms. The alcohol-based sol included $Al(OC_4^sH_9)_3$ and $Si(OC_2H_5)_4$ ($SiO_2/Al_2O_3$=30, $Al_2O_3$ 0.141 mmol/g, $SiO_2$ 4.24 mmol/g). About 0.0250 gms of the alcohol-based sol was deposited on the surface of the membrane. The membrane was then treated hydrothermally at 90° C. for 5 hours. Then it was dried at 90° C. and 120° C. for one hour and 6 hours, respectively.

After the foregoing pretreatment, a zeolite membrane was formed from the membrane employing the same method disclosed in Example IV.

EXAMPLE VI

A 2000 Å $\gamma$-$Al_2O_3$ membrane was employed as a porous support. A zeolite membrane was formed from the membrane by the same method disclosed in Example III. The increased weight percent of the sample, as compared to the initial weight of the sample, was 1.27%.

After the membrane was calcined at 500° C. for two hours, it was coated by an alcohol-based sol which included $Al(OC_2^sH_9)_3$ and $Si(OC_2H_5)_4$ ($SiO/Al_2O_3$=30). The treatment employed in Example 4 was then repeated to form a zeolite membrane.

EXAMPLE VII

A 40 Å $\gamma$-$Al_2O_3$ membrane was dried and calcined at 120° C. and then at 550° C. each for two hours. The weight of the membrane was 0.9532 gms. The membrane was then saturated with n-tridecane. About 0.0356 gms of caustic solution (pH=10) was deposited on the surface of the sample. Because the membrane has more affinity for basic water than for n-tridecane, the water (pH=10) replaced n-tridecane in the pores of the sample. The membrane was coated by an alcohol-based sol of $Al(OC_4^sH_9)_3$, $Si(OC_2H_5)_4$, $NaOC_2H_5$ and Tetrapropylammonium bromide $((CH_3CH_2CH_3)_4NBr)$ in ethanol which has following molar composition: $SiO_2/Al_2O_3$=103.4, $SiO_2/Na_2O$=9.85; $SiO_2/TPABr$=9.93; and $C_2H_5OH/SiO_2$=11.35. The membrane was placed on a stainless steel sieve which had been mounted in the autoclave and kept separate from a water layer in the autoclave. The autoclave was sealed and then heated to 95° C. and then to 130° C. for two hours, each. The temperature was then raised to 200° C. and held at that temperature for 13 hours. The product was washed with deionized water. It was then dried and calcined. The temperature was slowly raised from about ambient to 600° C., at which it held for two hours.

The membrane was thereafter saturated with n-tridecane and coated by water (pH=10). The reaction mixture was incorporated into the membrane again and then treated hydrothermally at 90° C. and 200° C. for 4 hours and 16 hours, respectively. The resulting zeolite membrane was washed, dried and then calcined.

EXAMPLE VIII

A 40 Å $\gamma$-$Al_2O_3$ membrane was dried and calcined at 120° C. and then 550° C., each for two hours. The weight of the membrane was 0.4542 gms. The membrane was then saturated with n-tridecane. About 0.0393 gms of water (pH=10) was deposited on the surface of the membrane and consequently replaced a portion of the n-tridecane in the pores of the membrane. The membrane was then coated by an alcohol-based sol of $Al(OC_4{}^sH_9)_3$, $Si(OC_2H_5)_4$ and $NaOC_2H_5)_4$ and $NaOC_2H_5$ in ethanol, the sol having the following molar composition: $SiO_2/Al_2O_3=2.15$; $Na_2O/Al_2O_3=2.99$; and $C_2H_5OH/Na_2O=10.27$. The membrane was placed on a stainless steel sieve which had been mounted in the autoclave and kept separate from water. The autoclave was sealed and heated to 98° C. for 5 hours. The resulting zeolite membrane was washed with deionized water. The membrane was kept overnight at a temperature of 98° C.

The membrane was then saturated with n-tridecane and coated with water (pH=10). About 0.0101 gms of the alcohol-based sol was thereafter incorporated into the membrane by capillary action. The membrane was then treated hydrothermally at 100° C. for 4 hours. The resulting zeolite membrane was washed, dried and calcined.

The permeabilities of the 40 Å $\gamma$-$Al_2O_3$ membrane and an A-type zeolite membrane for cyclohexane and n-heptane at room temperature and at various pressures are shown in Table III.

TABLE III

| | Flux of Solvents for Various Membranes | | | |
|---|---|---|---|---|
| Membranes | Pressure Difference (atm) | Flux (ml/mm$^1$ min) × 10$^{-3}$ | | $F_n/F_c$ |
| | | cyclohexane | n-heptane | |
| 40Å $\gamma$-$Al_2O_3$ | 6.8 | 1.11 | 1.64 | 1.48 |
| | 20.4 | 4.93 | 5.92 | 1.20 |
| A-type zeolite (from Example XIII) | 6.8 | 0.793 | 1.97 | 2.72 |
| | 20.4 | 0.920 | 5.26 | 7.28 |

EXAMPLE IX

A 40 Å $\gamma$-$Al_2O_3$ membrane was dried and calcined at 120° C. and then 550° C., each for two hours. The weight of the membrane was 0.4468 gms. An alcohol-based sol which included $Al(OC_4l^sH_9)_3$ and $Si(OC_2H_5)_4$ ($SiO_2/Al_2O_3=2.015$ 0.0200 g was deposited on the surface of the membrane. The membrane was treated hydrothermally at 90° C. for 5 hours. Thereafter, the membrane was dried at 90° C. and 120° C. for 12 hours and 2 hours, respectively.

After the foregoing pretreatment, about 0.0104 gms of sodium hydroxide (concentration 0.02 mol/l) was deposited on the sample. The membrane was then coated with about 0.0090 gms of an alcohol-based sol which included $Al(OC_4{}^sH_9)3$, $Si(OC_2H_5)_4$ and $NaOC_2H_5$ in ethanol. The alcohol-based sol was prepared as follows: one ml of the sol ($SiO_2/Al_2O_3=2.104$; and $Na_2O/Al_2O_3=1.979$, having the following concentrations: $SiO_2$ 0.9623 mmol/g; and $Al_2O_3$ 0.4574 mmol/g, $Na_2O$ 0.9051 mmol/g) was diluted by ethanol until the total volume was 40 ml. The coated membrane was placed on a stainless steel sieve which had been mounted in the autoclave and kept separate from water. The autoclave was sealed and heated at 90° C. and 120° C. for 5 hours and 2 hours, respectively. The product was washed and dried overnight at 90° C. and at 120° C., each for two hours.

The dried membrane was coated by another alcohol-based sol of $Al(OC_4{}^sH_9)_3$, $Si(OC_2H_5)_4$ $NaOC_2H_5$ in ethanol. The weight added was 0.0144 gms. The sol was prepared as follows: one ml of the solution $SiO_2/Al_2O_3=2.092$, $Na_2O/Al_2O_3=1.19$, having the following concentrations: $SiO_2$ mmol/g, $Al_2O_3$ 0.5974 mmol/g, $Na_2O$ 0.6996 mmol/g) was diluted by ethanol until the total was 4 ml. The membrane was treated hydrothermally at 90° C. for 5 hours. The product was dried at 90° C. and 120° C. for one hour and two hours, respectively. About 0.013 gms of sodium hydroxide solution (concentration 0.02 mol/l) was deposited on the surface of the dried sample. Then the membrane was coated by about 0.0189 gms of the alcohol-based sol ($SiO_2/Al_2O_3=2.104$, $Na_2O/Al_2O_3=1.979$), employed earlier. It was treated hydrothermally at 120° C. for two hours. The product was washed and dried at 90° C. and 110° C. for one hours and hours, respectively.

The resulting zeolite membrane was employed for separation of cyclohexane, n-heptane and TIPB (mixed in equal volumes) at room temperature, at a feed-side pressure of 1 atm. and a downstream-side pressure of 100 Torr. The composition of the permeate included: cyclohexane, 48.98%; n-heptane, 45.56%; and TIPB, 5.46%. The flux was 822 ml m$^{-2}$ h$^{-1}$.

EXAMPLE X

The 40 Å $\gamma$-$Al_2O_3$ membrane was dried and then calcined at 120° C. and 550° C. for two hours, respectively. After cooling, it was weighed. The weight of the sample was 0.4322 g. The solution of the mixture of $Al(OC_4{}^sH_g)_3$ and $Si(OC_2H_5)_4$ ($SiO_2/Al_2O_3=30$; $Al_2O_3=0.141$ mmol/gm, $SiO_2=4.24$ mmol/gm). 0.0183 gm was placed on the surface of the membrane. The sample was treated hydrothermally at 90° C. for 5 hours. Then it was dried at 90° C. overnight and at 120° C. for 2 hours. The solution was added on the sample again. The weight of the solution added was 0.0135 gm. The sample was treated hydrothermally at 90° C. for 5 hours. Then it was dried at 120° C. overnight. The solution was added on the sample for a third time. The weight of the solution added was 0.0152 gm. After hydrothermal treatment, it was dried at 120° C. for 2 days. The weight of the sample was 0.4437 gm. The increased weight percent based on the initial weight was 2.7.

The reason for using silica-alumina gel to block the pores of the $\gamma$-$Al_2O_3$ membrane before the synthesis was to protect the $\gamma$-$A_2O_3$ membrane from being damaged when the synthesis was carried out. The pore size decreased by silica-alumina gel was of advantage for synthesizing microcrystal zeolite membranes. The ZSM-5 zeolite membrane was prepared to illustrate the method of the synthesis.

After the foregoing pretreatment, a sodium hydroxide solution (concentration 0.02 mol/l) was added on the sample. The weight added was 0.0184 gm. Then the sample was coated by the mixture of $Al(OC_4{}^SH_g)_3$, $Si(OC_2H_5)_4$ and $NaOC_2H_5$ in ethanol. The weight added was 0.0222 gm. The solution was prepared as follows. One ml of the solution ($SiO_2/Al_2O_3=30.14$, $Na_2O/Al_2O_3=3.01$, concentration: $SiO_2=3.37$ mmol/gm, $Al_2O_3=0.112$ mmol/gm, $Na_2O=0.337$ mmol/gm) was diluted by ethanol until the total volume was 10 ml.

The coated sample was placed on the stainless steel screen which had been mounted in the autoclave and kept away form water. The autoclave was sealed and heated at 90° C. for six hours. Next, the temperature was raised to 200° C. and was held for twelve hours. The product was washed by deionized water. Then it was dried at 90° C. and 110° C. for one hour and six hours, respectively. In this manner, the synthesis was terminated at induction-nucleation period since it was previously reported that there were ZSM-5 crystals of less than 8 nm size in an amorphous matrix during the induction-nucleation period.

The sample from the above synthesis had good selectivity for p-xylene. The mixture of p-xylene, m-xylene and 1,3,5-Triisopropylbenzene (mixed in equal volumes) was passed through the ZSM-5 zeolite membrane at room temperature at feed-side pressure of 17 atm and downstream-side pressure of 10 Torr. The composition of the permeate were p-xylene 93.8%, m-xylene 6.2%, 1,3,5-Triisopropylbenzene 0%.

EQUIVALENTS

Those skilled in the art will recognize, or be able to ascertain using no more than routine experimentation, many equivalents to the specific embodiments of the invention described specifically herein. Such equivalents are intended to be encompassed by the following claims.

I claim:

1. A method of forming a zeolite membrane, comprising the steps of:
   a) forming a sol composition which, during exposure to an atmosphere saturated with steam at a sufficient temperature and for a sufficient period of time, will form a zeolite;
   b) contacting a porous support with the sol composition; and
   c) exposing the porous support and the sol composition to an atmosphere saturated with steam at a temperature sufficient for a period of time sufficient to cause the sol composition to hydrothermally crystallize, thereby forming the zeolite membrane.

2. A method of claim 1 wherein contact of the porous support with the sol composition causes the sol composition to at least partially penetrate the pores of the porous support.

3. A method of claim 2 wherein the sol composition is an aqueous-based sol composition.

4. A method of claim 3 wherein the sol is of a sufficient concentration to cause the sol composition to gel during penetration of said sol composition into the pores of the porous support.

5. A method of claim 4 wherein the sol composition formed has a volumetric ratio of water to silica in the range of between about 5 and 50.

6. A method of claim 5 further including the step of contacting the porous support with an organic fluid, whereby the pores of the porous support are substantially filled with the organic fluid before contacting the porous support with the sol composition, and whereby subsequent contact of the porous support with the sol composition causes a portion of the organic fluid to be displaced from the pores of the porous support.

7. A method of claim 6 wherein the organic fluid has a boiling point higher than water at atmospheric pressure.

8. A method of claim 7 further including the step of disposing the porous support in a layer of the organic fluid before exposing the porous support and sol composition to an atmosphere and to a temperature sufficient to cause hydrothermal crystallization of the sol composition.

9. A method of claim 8 wherein the porous support has a contact side, the contact side of the alumina support having an average pore diameter of up to about 2,000 Å.

10. A method of claim 9 further including the steps of:
    a) contacting the zeolite membrane with additional sol composition whereby gaps in the zeolite membrane are at least partially filled by said sol composition; and
    b) exposing the zeolite membrane and sol composition to an atmosphere and to a temperature sufficient to cause the sol composition to hydrothermally crystallize and form additional zeolite, whereby the gaps are substantially filled with the additional zeolite.

11. A method of claim 10 wherein the porous support is a composite.

12. A method of claim 11 wherein the porous support is a substantially flat sheet.

13. A method of claim 11 wherein the porous support is a tube.

14. A method of claim 13 wherein the concentration of sol particles of the sol composition is significantly less than that of the aqueous-based sol composition formed for contact with the porous support.

15. A method of claim 14 wherein the zeolite membrane and the additional sol composition are exposed to a temperature in the range of between about 90° C. and 200° C. for a period of time in the range of between about three hours and seven days during hydrothermal crystallization.

16. A method of claim 15 wherein the sol composition includes a template agent.

17. A method of claim 2 wherein the sol composition is an alcohol-based sol composition.

18. A method of claim 17 further including the step of contacting the porous support with a solution of caustic, whereby the pores of the porous support are substantially filled with the caustic solution before contacting the sol composition with the porous support, and whereby subsequent contact of the porous support with the sol composition causes a portion of the caustic solution to be displaced from the pores of the porous support.

19. A method of claim 18 further including the step of disposing the porous support on a support and above a water layer before exposing the porous support and the sol composition to an atmosphere and to a temperature sufficient to cause hydrothermal crystallization of the sol composition.

20. A method of claim 19 further including the step of exposing the sol composition to a solution of caustic having a pH in the range of between about 13 and 14.

21. A method of claim 20 wherein the sol composition formed has volumetric ratio of alcohol to silica in the range of between about five and one thousand.

22. A method of claim 21 wherein the sol composition includes an alkali alkoxide component.

23. A method of forming a zeolite membrane, comprising the steps of:
  a) contacting a porous support with an organic fluid, the organic fluid having a boiling point higher than water at atmospheric pressure, whereby the pores of the porous support are substantially filled with the organic fluid;
  b) forming a sol composition which, during exposure to an atmosphere saturated with steam at a sufficient temperature and for a sufficient period of time, will form a zeolite;
  c) contacting the porous support with the sol composition, whereby sol particles of the sol composition penetrate at least a portion of the pores of the porous support and displace at least a portion of the organic fluid from the pores of the porous support.

24. A zeolite membrane, formed by a method comprising the steps of:
  a) forming a sol composition which, during exposure to an atmosphere saturated with steam at a sufficient temperature and for a sufficient period of time, will form a zeolite;
  b) contacting a porous support with the sol composition; and
  c) exposing the porous support and the sol composition to an atmosphere saturated with steam at a temperature sufficient for a period of time sufficient to cause the sol composition to hydrothermally crystallize, thereby forming the zeolite membrane.

25. In a method for forming a zeolite membrane wherein a porous support is contacted with a composition which can form a zeolite, and is then exposed to conditions sufficient to cause the composition to form a zeolite:
  the improvement comprising forming the composition into a sol composition and then contacting the porous support with the sol composition, whereby sol particles of the sol composition penetrate at least a portion of the pores of the porous support, and exposing the alumina support and the sol composition to an atmosphere and to a temperature sufficient to cause the sol composition to hydrothermally crystallize, thereby forming the zeolite membrane.

* * * * *